United States Patent [19]
Fusiak et al.

[11] Patent Number: 5,268,116
[45] Date of Patent: Dec. 7, 1993

[54] NON-FLAMMABLE, PSEUDO-PLASTIC DEICING COMPOSITION

[75] Inventors: Frank Fusiak, Bayonne; Ki-Ho Chung, Oak Ridge; Thomas C. Bohrer, Franklin Lakes, all of N.J.

[73] Assignee: ISP Investments Inc., Wilmington, Del.

[21] Appl. No.: 52,872

[22] Filed: Apr. 26, 1993

[51] Int. Cl.$^5$ .............................. C09K 3/18
[52] U.S. Cl. ...................... 252/70; 106/13; 524/388
[58] Field of Search ............ 252/70; 206/13; 260/78.5; 524/389

[56] References Cited

U.S. PATENT DOCUMENTS

| | | | |
|---|---|---|---|
| 3,939,090 | 2/1976 | Zmoda | 252/90 |
| 3,940,356 | 2/1976 | Byrnes | 260/29.6 E |
| 4,358,389 | 11/1982 | Kohig-Lurner et al. | 252/70 |
| 4,698,172 | 10/1987 | Tye et al. | 252/70 |
| 5,034,488 | 7/1991 | Tazi et al. | 526/271 |
| 5,118,435 | 6/1992 | Nieh | 252/70 |

*Primary Examiner*—Paul Lieberman
*Assistant Examiner*—Necholus Ogden
*Attorney, Agent, or Firm*—Marilyn J. Maue; Joshua J. Ward

[57] ABSTRACT

This invention relates to a glycol based anti-icing fluid containing between about 0.05 and about 2 wt. % of 1.5 to 5% crosslinked maleic anhydride/methyl vinyl ether copolymer and between about 0.01 and about 2 wt. % base to provide a pH of from about 6.5 to about 10.

7 Claims, 2 Drawing Sheets

NON-FLAMMABLE, PSEUDO-PLASTIC DEICING COMPOSITION

In one aspect this invention relates to a deicing composition which is particularly useful on aircraft and other surfaces subject to significant changes in wind shear, e.g. automotive windshields and the like.

In another aspect the invention relates to the application of the present deicing composition to a weather exposed surface such as for example a surface of metal, glass, plastic or wood.

BACKGROUND OF THE INVENTION

Transport vehicles that are parked on the ground for significant periods can accumulate snow, ice or frost on their exposed surfaces in cold weather. The presence of such deposits, particularly on airfoil surfaces, is highly undesirable during aircraft takeoff and flight, since even small accumulations can result in severe deterioration of airfoil aero-dynamic performance characteristics.

Ethylene glycol has long been used in aqueous solutions of various strengths for spraying onto aircraft and automotive vehicles as a deicing agent to remove snow, ice and frost deposits from glass and metal surfaces. After treatment, the glycol fluid desirably remains on the surface as a film-coating to provide continued anti-freeze protection and minimize further formation or accretion of snow, ice or frost deposits. The glycol based fluid, in various concentrations, has been used for both deicing and anti-icing functions on a wide variety of surfaces.

Generally, the glycol based fluid contains a thickening agent for surface retention.

Desirably, these deicing compositions should possess the following attributes:
 (1) a flashpoint greater than 100° C.
 (2) hard water compatibility
 (3) a freezing point below −20° C.
 (4) biodegradability
 (5) storage stability
 (6) ability to form a continuous film-coating using conventional spraying devices
 (7) a pour point greater than 6° C.
 (8) non-corrosive properties with respect to cladded or uncladded aluminum or other metal surfaces
 (9) non-degradability toward painted surfaces and
 (10) viscosity and rheology characteristics that promote formation of an effective, tenacious film-coating at low shear conditions while enabling the fluid coating to flow off the surface under high shear conditions.

A deicing composition which meets all of the above criteria is difficult to obtain which is evidenced by the fact that none of the prior compositions have proved to be entirely satisfactory in all of these respects. Many of the prior compositions which depend on volatile solvents possess an evaporation rate which is too rapid to effect ice release over an extended period. Such compositions are disclosed in U.S. Pat. Nos. 3,940,356 and 3,939,090. The latter composition finds limited use due to its inclusion of anionic compounds, e.g. halide and sulfur containing compounds, which have been shown to be extremely corrosive to aluminum and ferrous substrates. The deicing compositions disclosed in U.S. Pat. No. 5,118,435 depends on a complicated formulation involving blends of several polymers and requires significant amounts of thickeners for extended deicing. U.S. Pat. No. 4,698,172 employs carrageenan, a sulfated seaweed extract as a thickener which appears to have adequate deicing properties but which encounters problems in uniformity of the extract barring lengthy and expensive purification procedures. There remains a need for an economical, anti-icing composition that exhibits high pseudo-plastic rheology and which under low shear conditions is relatively insensitive to temperature changes. Another highly desirable attribute is ability to remain stable for relatively long periods of time in order to delay or avoid reapplication of the composition during aircraft departure holdovers.

Accordingly, it is an object of this invention to provide an economical deicing composition having good stability and high pseudo-plastic properties which are insensitive to temperature changes below freezing temperature.

Another object of this invention is to provide deicing composition meeting all of the above criteria which is particularly useful as a sprayed continuous coating on aircraft between flights and on automobile windshields.

These and other objects of the invention will become apparent to those skilled in the art from the following description and disclosure.

THE INVENTION

Figure 1:
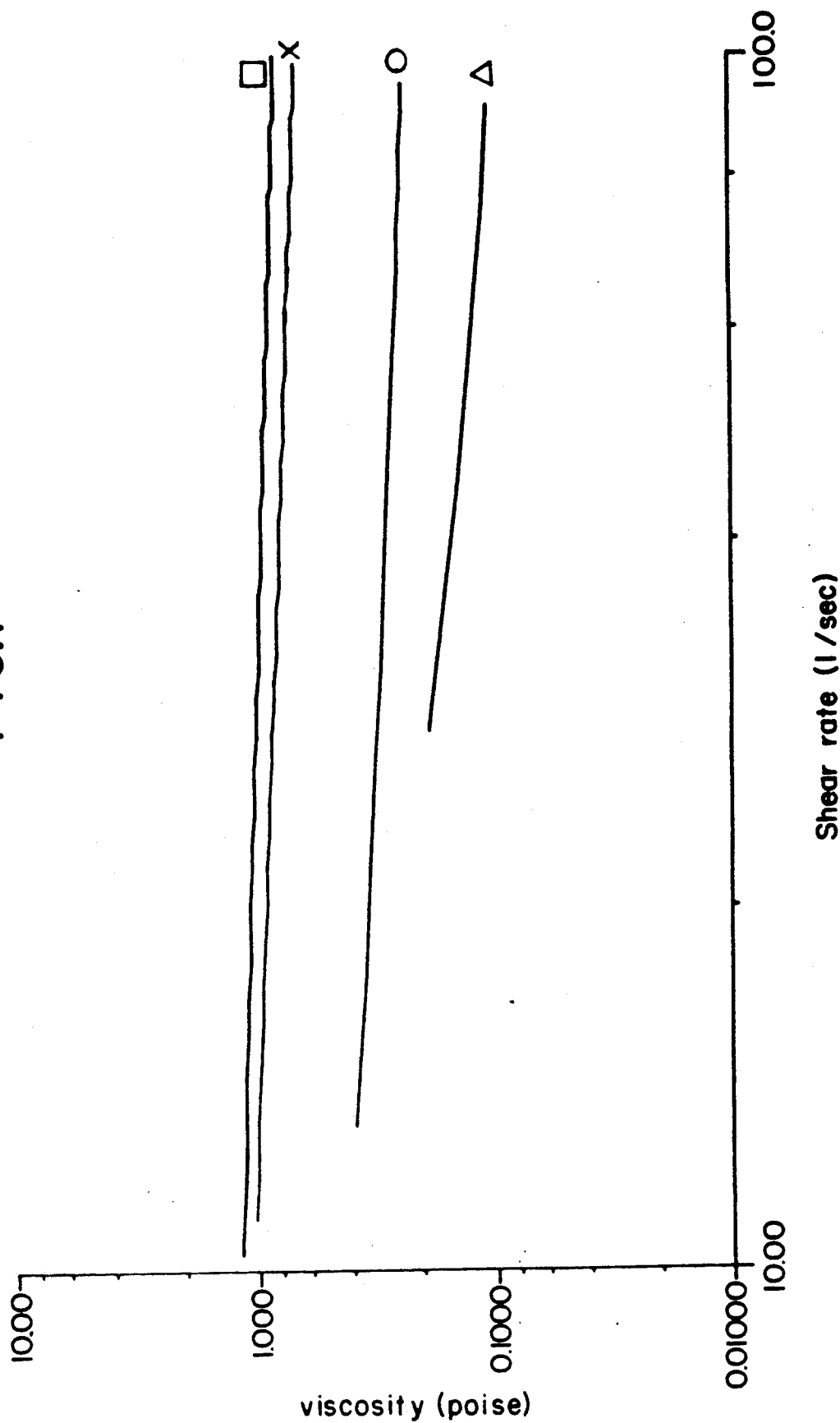
FIGS. 1 and 2 provide a rheological profile comparison of the present deicing composition with others in which at least one of the components of instant composition was omitted or substituted.

In accordance with this invention there is provided a highly stable, non-flammable, pseudo-plastic deicing composition consisting essentially of between about 97 and about 99.9 wt. % of an aqueous $C_2$–$C_3$ alkylene glycol solution; between about 0.05 and about 2 wt. % of the lightly crosslinked maleic anhydride-$C_1$ to $C_2$ alkyl vinyl ether copolymer and a sufficient amount of a basic compound to provide a composition pH of from about 6.5 to about 10.

Although the alkylene glycol component of the present composition can contain from about 20 to about 80% water, the glycol concentration in the aqueous solution is more desirably between about 40 and about 60%. The most effective concentration of crosslinked copolymer has been found to be between about 0.08 and about 1 wt. % of the composition. Although the copolymer in the proportion of 30 to 70% maleic anhydride and 70–30% alkyl vinyl ether is suitable, equal amounts of monomer and comonomer provide the best results. Accordingly, a most preferred copolymer of this invention is approximately a 50-50 maleic anhydride-methyl vinyl ether copolymer which is 1.5–5% crosslinked, most desirably 2–3% crosslinked, and having a Brookfield viscosity of between about 50,000 and about 70,000 cps, a 0.5% aqueous solution at 25° C.

Suitable crosslinking agents for the maleic anhydride-alkyl vinyl ether copolymer include any of the conventional types such as the divinyl ethers of an aliphatic diol, e.g. the divinyl ethers of 1,2-ethanediol; 1,3-propanediol; 1,4-butanediol, 1,5-pentanediol; 1,6-hexanediol; 1,7-heptanediol; 1,8-octanediol; 1,9-nonanediol; 1,10-decanediol; 1,11-undecanediol; and 1,12-dodecanediol, as well as the divinyl ethers of diethylene glycol, triethylene glycol, tetraethylene glycol, pentaethylene glycol; hexaethylene glycol, heptaethylene glycol, octaethylene glycol, nonaethylene glycol, decaethylene glycol, dienes such as 1,7-octadiene, 1,9-decadiene, divinylbenzene, N,N'-bis-methylene acrylamide, acrylates such as polyethylene glycol diacrylate, trimethylolpropane triacrylate, propylene glycol diacrylate, mono- or poly-esterified polyhydric alcohols esterified with acrylic acid triallylamine, tetraallylethylenediamine, diallyl phthalate, and the like, dienes being preferred and 1,9-decadiene, as in the crosslinked copolymer marketed as STABILEZE ® 06, being most preferred.

The basic component for adjusting the pH of the composition is generally employed in a concentration of between about 0.01 and about 2 wt. %. This component can be any organic or inorganic base, such as potassium hydroxide, sodium hydroxide, ammonia, mono- and poly-ethanol amines, trimethyl amine, and the like.

Although the present compositions can be applied to a wide variety of surfaces in order to prevent icing or ice accretion, it finds particular advantage as a deicing composition for surfaces which are subject to marked changes in shear rates such as are encountered in vehicular windshields and aircraft surfaces. Instant composition possesses high pseudo-plastic rheology so that at low shear, the viscosity of the composition remains constant and adheres to the surface on which it is sprayed. However, at a high shear rate, for example upon aircraft take-off, the polymer in the composition expands from its relaxed state, thus reducing its viscosity so that it easily flows off the surface and causes no problem or deterioration of airfoil, aerodynamic performance or windshield visibility. The high stability of the present composition at a low or zero shear rate allows for spraying of an aircraft surface early in its holdover pattern without need for reapplication of the deicing fluid immediately prior to take-off which may take place after several hours. Other advantages of this deicing composition include its biodegradability and its non-corrosive character on metal surfaces including cladded and uncladded aluminum surfaces commonly used in aircraft. The composition is also benign to painted surfaces or plastics and since the need for alcohol in the composition is eliminated, cautionary procedures against flammability are also overcome. Since the present composition has the desired sprayable consistency, the need for an extraneous thickener and thickener blends is eliminated. These and many other properties of the composition are useful for particular uses and applications.

The present composition is economically and easily prepared by adding the copolymer to deionized water at a temperature of from about 60° to about 85° C. under agitation for a period of from about 0.5 to about 2 hours before the addition of the basic compound followed by introduction of the glycol. The entire mixture is constantly agitated until a homogeneous liquid is obtained. The resulting product can be stored or used immediately and sprayed onto a surface with conventional spraying devices.

The present composition can also contain one or more optional excipients, each in an amount up to about 5 wt. % of the total composition. Such additives include a corrosion inhibitor, such as e.g. ethoxylated butynediol, blends of propargyl alcohol, thiourea and alkaline metal salts of tolyltriazole or benzotriazole; a supplemental surfactant, e.g. the non-ionic type, e.g. an ethoxylated or propoxylated alkyl phenol (IGEPAL ®), dodecylphenyl polyethylene glycol ether (TERGITROL ®), N-C$_8$ to C$_{18}$ alkyl pyrrolidone (SURFADONE ®) and polyalkoxylated fatty acid esters (TRYDET ®) and any of the conventional coloring agents.

Having generally described the invention, reference is now had to the accompanying examples which illustrate preferred embodiments but which are not to be construed as limiting to the scope of the invention as more broadly defined above and in the appended claims.

EXAMPLE 1

In a 1500 ml glass beaker containing 499.5 g deionized H$_2$O at 70° C. was gradually added under constant agitation 1.0 g STABILEZE ® 06 (a 2.5% 1,9-decadiene crosslinked 50/50 copolymer of maleic anhydride-methyl vinyl ether). After one hour 2.60 g of NaOH (10% aqueous) was added followed by 499.5 g of propylene glycol. The resulting mixture was stirred for an additional hour at 70° C. after which a homogeneous liquid composition is obtained.

COMPARATIVE EXAMPLE 2

Example 1 was repeated except that 1.0 g of Carbopol 934 (2.5% crosslinked copolymer of acrylic acid and polyallyl sucrose) was substituted for STABILEZE ® 06.

COMPARATIVE EXAMPLE 3

Example 1 was repeated except the addition of STABILEZE ® 06 and base were omitted.

COMPARATIVE EXAMPLE 4

Into a 1,000 ml beaker containing 499.5 g. of propylene glycol, was added 1.0 g. of carrageenan gum (GELCARIN GP 379, supplied by FMC Corp., Marine Colloid Division). The ingredients were mixed until a uniform mixture was obtained; after which 499.5 g. of deionized water was introduced and mixed until a homogeneous liquid was achieved.

The viscosity of the products of Examples 1, 2, 3 and 4 as a function of shear rate was then determined at 25° C. and at −10° C. using a Carri-Med CSL rheometer. The data were analyzed by Herschel-Bulkley fluid model wherein $$\text{Shear Stress} = A + B \text{ (shear rate)}^c \quad (1)$$

In the equation, A represents the yield shear stress, B is the viscosity coefficient measuring viscosity, and c is the flow index measuring shear sensitivity of viscosity. For a Newtonian fluid c equals to 1, which indicates that viscosity is independent of shear rate. The smaller the c value, the more shear sensitive, i.e. shear thinning. The results of this analysis are reported in the following table.

TABLE

| Product of Example | Temperature | A | B | C |
|---|---|---|---|---|
| 1 | −10° C. | 0.0 | 8.59 | 0.79 |
|   | 25° C. | 0.0 | 1.82 | 0.81 |
| 2 | −10° C. | 0.0 | 7.80 | 0.76 |
|   | 25° C. | 0.2 | 1.67 | 0.78 |
| 3 | −10° C. | 0.0 | 0.43 | 0.97 |
|   | 25° C. | 3.3 | 0.06 | 1.00 |
| 4 | −10° C. | 1.76 | 1.94 | 0.85 |
|   | 25° C. | 1.71 | 0.37 | 0.87 |

In the above, the viscosity is directly proportional to the value shown in column B and the degree of shear thinning is proportional to (1−n) where n is the value shown in column C. Zero shear thinning is indicated by the value 1. The superiority of the product of Example 1 over those of Examples 2–4 is indicated by its higher viscosity while stationary which property allows this product to remain on the surface of the substrate for longer periods, as when aircraft is held over for extended periods between flights or when automotive equipment parked for several hours.

EXAMPLE 5

Using hand held 8 oz. polyethylene bottles with trigger spray heads, the above products of Examples 1–4 were separately sprayed onto a 2 foot square ice covered windshield of a truck. The products of Examples 3 and 4 quickly ran off and did not remove the ice buildup. The products of Examples 1 and 2 both adhered to the windshield of the parked vehicle, and when the vehicle was driven at 55 mph, both quickly flowed off; however it was noted that the product of Example 1 remained on the windshield at this shear level 5 minutes longer than that of Example 2 and further extended the period of protection against ice accumulation and buildup.

DESCRIPTION OF THE DRAWINGS

Figure 2:
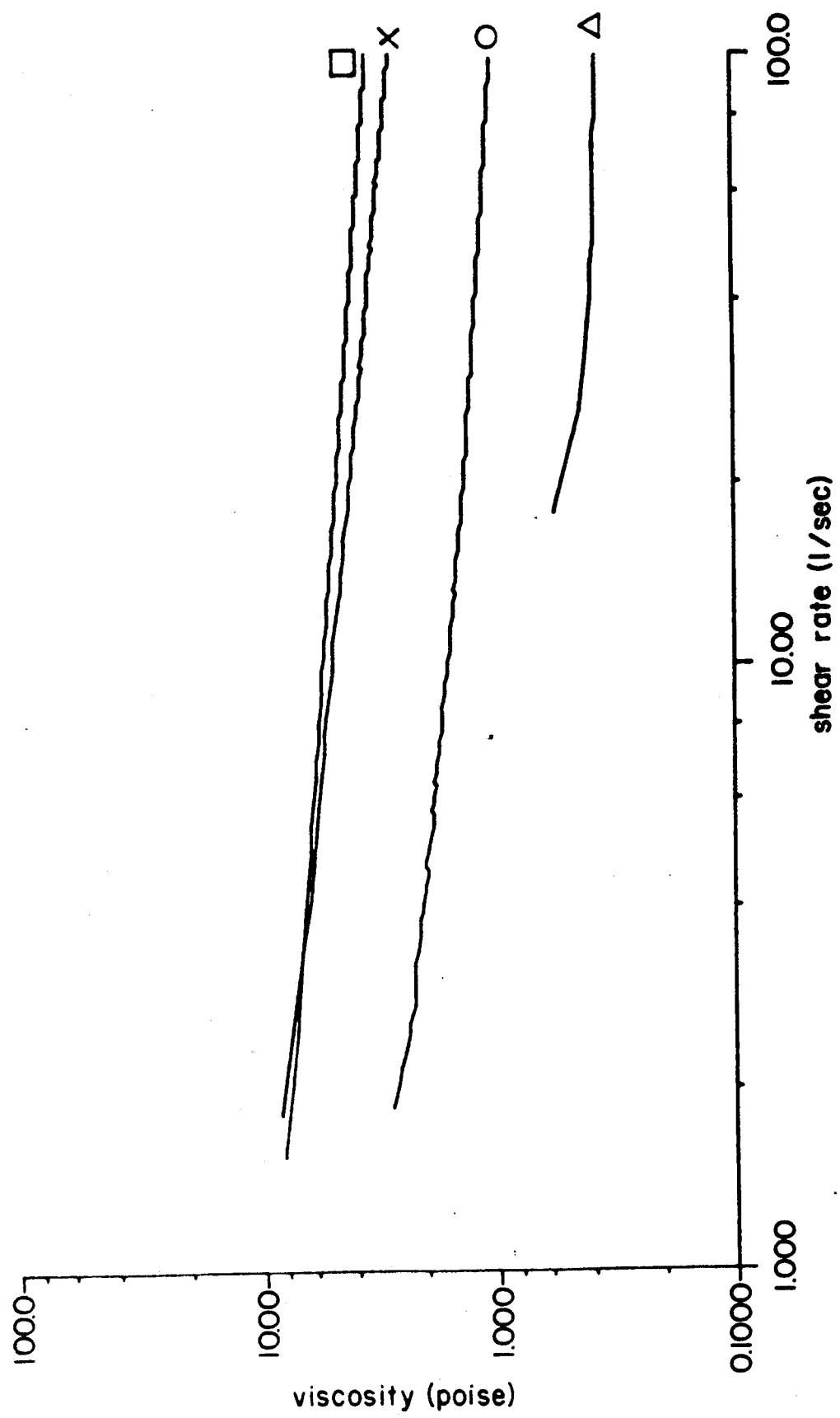

FIGS. 1 and 2 illustrate the rheological profile of deicing for Example 1–4 products at 25° C. and at −10° C. respectively using a Carri-Med CS Rheometer. In FIG. 1 and in FIG. 2, the composition of Example 1 is indicated by □, that of Example 2 is shown by X, that of Example 3 is indicated by Δ and that of Example 4 is indicated by ○. The pseudoplastic nature of the present composition is apparent in these figures.

What is claimed is:

1. A biodegradable, non-flammable, pseudo-plastic deicing composition consisting essentially of
   (a) between about 97 and about 99.9 wt. % of aqueous $C_2$ to $C_3$ alkylene glycol;
   (b) between about 0.05 and about 2 wt. % of 1 to 5% crosslinked maleic anhydride-$C_1$ to $C_2$ alkyl vinyl ether copolymer and
   (c) a basic compound in an amount sufficient to adjust the pH of the composition to between abut6.5 and about 10.

2. The composition of claim 1 which additionally contains at least one additive of the group of a dye, a corrosion inhibitor and a surfactant.

3. The composition of claim 1 wherein the copolymer is a 2 to 3% diene crosslinked copolymer of maleic anhydride and methyl vinyl ether.

4. The composition of claim 2 wherein the composition contains a corrosion inhibitor selected from the group of an ethoxylated butynediol, blended propargyl alcohol, thiourea and an alkaline metal or ammonium salt of tolyltriazole or benzotriazole.

5. The process of applying to a surface which is subject to moisture under freezing conditions, a effective deicing amount of the composition of claim 1.

6. The process of claim 5 wherein said surface is the exposed surface of an aircraft.

7. The process of claim 6 wherein said surface is the exposed glass surface of an automotive windshield.

* * * * *